United States Patent [19]

Palilla

[11] Patent Number: 4,575,440

[45] Date of Patent: Mar. 11, 1986

[54] PROCESS FOR THE PREPARATION OF HOMOGENEOUS METAL OXIDE VARISTORS

[75] Inventor: Frank C. Palilla, Framingham, Mass.

[73] Assignee: GTE Laboratories Incorporated, Waltham, Mass.

[21] Appl. No.: 581,927

[22] Filed: Feb. 21, 1984

[51] Int. Cl.[4] .......................... C04B 33/34; H01B 1/06

[52] U.S. Cl. ...................................... 264/61; 252/518; 252/519; 252/520; 264/62; 264/65; 264/66; 29/621; 338/309

[58] Field of Search ....................... 252/518, 519, 520; 338/20, 307, 308, 309; 29/610, 620, 621; 419/31, 33, 39, 40, 53, 54; 264/61, 62, 65, 66; 427/101-103; 501/94, 126, 127, 132, 153

[56] References Cited

U.S. PATENT DOCUMENTS

| | | | |
|---|---|---|---|
| 4,031,498 | 6/1977 | Hayashi et al. | 29/610 |
| 4,038,217 | 7/1977 | Namba et al. | 252/519 |
| 4,094,061 | 6/1978 | Gupta et al. | 29/612 |
| 4,097,834 | 6/1978 | Mar et al. | 29/610 R |
| 4,108,483 | 12/1979 | Ho et al. | 252/518 |
| 4,111,852 | 9/1978 | Ho et al. | 252/518 |
| 4,142,996 | 3/1979 | Wong et al. | 252/518 |
| 4,265,844 | 5/1981 | Yokomizo et al. | 264/61 |
| 4,285,839 | 8/1981 | Wong | 252/518 |
| 4,297,250 | 10/1981 | Gupta et al. | 252/519 |
| 4,318,995 | 3/1982 | Rhodes et al. | 264/65 |
| 4,338,223 | 7/1982 | Yokomizo et al. | 252/519 |
| 4,386,021 | 5/1983 | Eda et al. | 252/519 |

FOREIGN PATENT DOCUMENTS 1551319 8/1979 United Kingdom .

*Primary Examiner*—Josephine L. Barr

*Attorney, Agent, or Firm*—Ivan L. Ericson

[57] ABSTRACT

A process for making a homogeneous metal oxide varistor powder is described. The ingredients desired in a varistor which are water and acid soluble and dissolved in water and acid respectfully to make a solution. The remaining ingredients which are water and acid insoluble are then suspended in the solution to make a homogeneous slurry. The slurry is dried, calcined, reslurried, dried, pressed and sintered. The sintered body has electrical leads attached then encapsulated in an epoxy resin to make an encapsulated varistor package.

5 Claims, No Drawings

PROCESS FOR THE PREPARATION OF HOMOGENEOUS METAL OXIDE VARISTORS

FIELD OF THE INVENTION

This invention relates to a process for manufacturing metal oxide varistors. More particularly, this invention relates to a process for manufacturing a homogeneous metal oxide varistor powder and its processing to a finished metal oxide varistor.

BACKGROUND OF THE INVENTION

The classical procedure for making metal oxide varistors such as zinc oxide varistors involves dry blending metal oxides and metal salts with zinc oxide powder. Water is than added to form a slurry and the slurry is then pan-dried while heating and stirring to attain a uniform distribution. The dried mixture is ground, sieved, calcined, crushed, sieved, re-made into a slurry with $H_2O$, a binder added, the mixture ball-milled (in order to reduce particle size and again obtain uniform distributions), pan-dried once more, crushed and again sieved. The powder is then ready for forming into appropriate configurations before sintering.

An intrinsic difficulty with this classical procedure of blending the metal oxide/metal salts with ZnO powder relates to the tremendous ranges in particle size, morphology, surface area, and chemical reactivity that have to be reconciled in order to achieve a uniform blend of all ingredients. It is usually necessary to utilize drastic mechanical means in order to effect a uniform blend (i.e. ball mills, grinders, pulverizers, etc.). Other non-mechanical means have included the selection of additives with more closely matched physical features (particle size, particle morphology, etc.) and rheological features (handling). This approach is difficult to realize because of the lack of sources from which such uniformity between radically different chemicals can be realized. Another technique has included the preconcentration of all or some of the additives by calcination and a portion of this preconcentrate is then treated as a single or major additive to the ZnO bulk.

The need to produce a homogeneous metal oxide varistor powder is great. The property of homogeneity is very important both in varistors for low voltage applications and for high voltage applications.

This homogeneity promotes uniform electrical properties due to uniform grain size; therefore, exceptional resistance to degradation when suppressing voltage surges can be obtained.

SUMMARY OF THE INVENTION

In accordance with one embodiment of the present invention, a process for making a homogeneous metal oxide varistor powder comprises the steps of:

(A) An appropriate amount of water soluble and acid soluble compounds of metals whose oxides are desired in a homogeneous metal oxide varistor powder are dissolved in an aqueous solvent to form an aqueous solution of the soluble compounds.

(B) To the aqueous solution from step (A) an appropriate amount of an oxide of each metal which does not have a water soluble or an acid soluble compound and whose oxide is desired in the varistor powder is mixed with the aqueous solution from step (A) to form a solution containing a suspension.

(C) The solution containing the suspension from step (B) is evaporated to dryness to form a homogeneous material.

(D) And the homogeneous material from step (C) is converted to an oxide of each metal contained therein to form a homogeneous metal oxide varistor powder.

In accordance with another embodiment of the present invention the homogeneous metal oxide powder made by the above described process is suspended in water and an appropriate amount of a wetting agent is added to form a slurry. The slurry is dried forming a dry powder. The dry powder is pressed and sintered forming a sintered body. Electrode leads are attached to the sintered body and then encapsulated to form an encapsulated homogeneous metal oxide varistor.

For a better understanding of the present invention, together with other and further objects, advantages and capabilities thereof, reference is made to the following disclosure and appended claims.

DETAILED DESCRIPTION OF THE INVENTION

The new and novel process described herein is unusual in that it seeks to circumvent physical differences by introducing the components via solutions from which fine, uniform, amorphous oxides will be simultaneously formed during the blending and processing operations.

In addition to effecting an exceptionally uniform dispersion of all the metal oxides in the final varistor, this new and novel process facilitates the use of spray drying technology for the preparation of the dried powder mixtures ready for forming and sintering into varistor bodies. The use of spray drying in turn circumvents many of the classical but tedious process steps of ball-milling, grinding, sieving, etc., thereby rendering the entire process amendable to preferred production techniques. This new process approach also permits a selection of the ZnO particle size. Small particle size is more active during sintering which can lead to larger grain sizes, and could result in lower clamping voltages per given thickness, and lower leakage currents—possibly by minimizing the conductive paths in the intergranular boundary layer. (i.e., smaller particle size normally does lead to greater sinterability but it does not necessarily lead to larger grain size in the size ranges considered here.) Indeed, an advantage of this process is that some control can be exercised over grain size with the easiest controllable variable, (i.e., the particle size of the ZnO). For the high voltage case the smallest available ZnO is used in order to maximize the clamping voltage (smaller grain size) while for the low voltage, automotive case. A larger ZnO for a lower clamping voltage (larger grain size).

The actual mechanics of this new and novel process is illustrated by the embodiment which follows:

An example of the compositions utilized are given in Table I. This table lists the eventual oxide ingredient (MO), the corresponding candidate precursor (soluble) salt, the conversion factors from the precursor to MO, and the amount of salt required per 200 ml so that a 10 ml aliquot gives the required MO concentration in the preparation of a 100 g charge of the varistor MO-ZnO powder.

Some general comments may be useful before describing a preferred example:

In some instances it may be useful to prepare a solution of the required amount of (MO) precursor salt just prior to use rather than to work from stock solutions. For example, for the preparation of 100 g MO-ZnO batches, the required weights of manganese acetate (3.947), cobalt acetate (9.929) or nitrate (11.603) and bismuth nitrate (16.656) are high enough to be accurately and reproducibly weighed. In the latter case, there is a minor solubility problem as well which is circumvented by the addition of a small amount of dilute nitric acid. It is therefore convenient to dissolve the 16.656 g of $Bi(NO_3)_3.5H_2O$ by addition of 10% $HNO_3$ dropwise while heating the salt in $H_2O$ on a hot plate and then adding this solution to the rest of the mix. In the analogous case of the PbO additive, it is difficult to obtain a clear solution without addition of dilute $HNO_3$ to the recommended salt solution of lead acetate, but the amount to be weighed out is small, i.e. 1.36 g. In this case then it is more convenient to dissolve 13.6 g of lead acetate in about 100 ml of $H_2O$, add about 20 drops of dilute $HNO_3$ to clear up any residual turbidity, and then dilute with $H_2O$ to 200 ml and use this as a stock solution.

Manganese acetate is preferably prepared as a solution just before use and in the quantity immediately required. The best solvent is cold water with which a clear solution is obtained. However, upon heating or upon standing the Mn precipitates out slowly, probably as $MnO_2$; therefore, the use of the immediately prepared clear solution as an additive to the remaining mix is preferred.

The chromium nitrate and aluminum nitrate are most conveniently used as stock solutions since these are easily dissolved directly in $H_2O$, the weights required would be inconveniently small if they were to be prepared just before use in the amounts required, and their stock solutions are very stable.

Despite their fairly easy solubility in $H_2O$, the use of antimony potassium tartrate solutions as sources for $Sb_2O_3$ and $K_2O$ are not as convenient as separate sources such as antimony trichloride and the potassium acetate of Table I. As the tartrate, the antimony and potassium would not normally be introduced in the desired ratios of the two. In many cases it is furthermore preferable to add one and not the other. In addition, the use of tartrates can lead to unwanted precipitations of the other elements of the mixed solution, depending upon the sequence in which the various additions are made. Finally, since a subsequent step will involve a calcination, it would be best to keep to a minimum a situation where dry nitrates and nitrogen oxides are heated in the presence of easily oxidizable organic anions.

The preference for the antimony source is a solution of $SbCl_3$ in HCl-$H_2O$. The correct amount of antimony chloride is dissolved in hot $H_2O$ with the dropwise addition of HCl until complete solution is achieved. This solution is then added dropwise to the solution mixture while cold and while stirring vigorously. A fine precipitate is formed immediately which redissolves until its solubility limit is exceeded, and any undissolved precipitate remains amorphous and is rapidly and uniformly dispersed. A more convenient addition which circumvents this precipitation may yet be available.

Finally, no convenient solution for a $TiO_2$ source was found. $TiCl_4$ is a liquid under normal conditions. It is difficult to work with however; upon exposure to the atmosphere it reacts with the moisture present to form a mist of insoluble $TiO_2$. The $TiO_2$ was therefore more conveniently added as a colloidal suspension of very fine $TiO_2$ powder in $H_2O$. This is almost as effective as a true solution. A suitably fine $TiO_2$ is available from many sources. (In the illustration below, the $TiO_2$ used was obtained from the Dagussa Company of Germany).

As indicated above, to avoid possible undesirable precipitation reactions along the way, and to permit direct observations of how compatible the various ingredients react among themselves, a definite sequence of additions is suggested. In general, a preferred sequence is that of (a) cobalt nitrate, chromium nitrate, lead acetate, potassium acetate, aluminum nitrate and bismuth nitrate solutions in any sequence; (b) freshly prepared solution of manganese acetate; (c) dropwise addition of the antimony chloride solution in HCl-$H_2O$ while stirring vigorously and using HCl washes for transfer from the original container; (d) slow addition of the ZnO powder while stirring and (e) lastly, addition of the colloidal suspension of $TiO_2$.

An example follows with all the ingredients described above except the $Al_2O_3$ and $K_2O$. The amounts given are for the preparation of a 200 g of a MO-ZnO varistor powder.

EXAMPLE 1

1. 11.603 g Fisher Lot #705793 $Co(NO_3)_2.6H_2O$, equivalent to 3.2 g $Co_3O_4$ are dissolved in 20 ml $H_2O$ in a 1000 ml beaker.

2. 20 ml of the stock solution of $Cr(NO_3)_3.9H_2O$, Fisher Lot 714755, equivalent to 0.28 g $Cr_2O_3$, is added to above while stirring with a magnetic stirrer.

3. 20 ml of the stock solution of $Pb(C_2H_3O_2)_2.3H_2O$, Fisher Lot 742852 and containing 20 drops of $HNO_3$/200 ml $H_2O$, equivalent to 0.80 g PbO is added to the above while stirring is continued.

4. 16.656 g of $Bi(NO_3)_3.5H_2O$, Fisher Lot 714580, equivalent to 8.00 g of $Bi_2O_3$ are dissolved in 100 ml of 10% $HNO_3$ while heating and stirring. After cooling this is transferred to the above using dilute $HNO_3$, as needed, for the transfer.

5. 3.9466 g of $Mn(C_2H_3O_2)_2.4H_2O$, Fisher Lot 700509 equivalent to 1.40 g $MnO_2$, are dissolved in 50 ml of room temperature $H_2O$ and transferred to the above using $H_2O$. (A very slight turbidity begins to appear). An overhead propeller-type motorized stirrer is also conveniently used from here on.

6. 0.5008 g of $SbCl_3$, Fisher Lot 715357, equivalent to 0.32 g $Sb_2O_3$ are dissolved using 20 ml $H_2O$ and the dropwise addition of 4 ml HCl while stirring and heating. This is then allowed to cool so as not to enhance the precipitation of the $MnO_2$ previously added, during the subsequent addition, i.e., this solution is then added dropwise to the above mixture while vigorously stirring so that the fine precipitate being formed is rapidly dispersed throughout the solution mixture. HCl is used, as needed, for the complete quantitative transfer of this $SbCl_3$ solution to the above.

7. 184.4 g of ZnO, St. Joe 911, Lot 355080 with a 9.5 $m^2/g$ surface area and 0.11 $\mu m$ average particle size, is gradually added to the above solution while stirring to give a uniform suspension.

8. 1.6 g of $TiO_2$, Dagussa Lot 0206019, are suspended in 75 ml of room temperature $H_2O$ and then transferred using $H_2O$, slowly and while stirring, to the above suspension.

9. The above suspension is brought to near dryness while stirring and heating on a hot plate.

10. The above mixture is transferred to a large flat glass tray and dried overnight in a drying oven set at 70° C.

11. The dried powder is gently crushed using a mortar and pestle, passed through a 60 mesh nylon sieve, transferred to a 200 ml $Al_2O_3$ crucible, and then calcined at 800° C. The calcination includes a 5 minute hold at 100° C. for complete moisture removal, a 10 minute hold at 260° C. for the nitrate evolution from $Bi(NO_3)_3$ and other nitrate salts, and another 15 minute hold at 380°-400° C. for the evolution of oxides of nitrogen from the thermal decomposition of residual nitrates. Then the temperature is increased to 800° C. to complete the conversion to the oxides.

12. The above powder obtained from the calcination is gently ground and sieved, $H_2O$ is added to give a 30-50% solids, binders are added, enough (≈20 ml) of a 5% PVA, polyvinyl alcohol, solution is added to give a final concentration of 0.5% PVA, and enough (≈40 ml) of a 5% carbowax solution is added to give a final concentration of 1% carbowax to form a slurry, the slurry is stirred, passed through a 400 mesh vibrating sieve, and it is ready for spray drying after the addition of 5 drops of Darvan "C" as a deflocculent.

13. The above slurry is spray dried using a Büche mini-spray dryer available from Brinkman Instruments of Westbury, N.Y.

14. The spray dried powder is pressed into the appropriate configuration and then sintered for 2 hours at 1400° C. with a heating rate of 10° C./min. and a cooling rate of 2.5° C./min.

15. The resultant sintered body has an electrically conductive coating selectively applied, such as aluminum and copper, electrical leads attached, and the whole body encapsulated in an epoxy resin.

Example #2 represents a formulation with equivalent additions of 3.90% $Bi_2O_3$, 0.24% NiO, 1.10% $Co_3O_4$, 0.14% $Cr_2O_3$, 0.0045% $Al_2O_3$, 0.123% $B_2O_3$, 0.34% PbO, 0.008% $K_2O$, 0.80% $MnO_2$, 0.11% $Sb_2O_3$, 0.80% $TiO_2$, and 92.435% ZnO. This is a preferred composition for automotive varistors and the procedure defines a preferred sequence. It also differs from Example 1 in that a subnitrate was used for the $Bi_2O_3$ precursor salt and a subacetate was used for the PbO precursor salt (33% assay).

EXAMPLE 2

1. 9.789 g of $Bi_5O(OH)_9(NO_3)_4$ were transferred to a 1 liter beaker. 100 ml of 20% $HNO_3$ were added to the beaker. The mixture was heated to dissolve the salt while stirring (magnetic).

2. 1.8681 g of $Ni(NO_3)_2.6H_2O$ were dissolved in 20 ml $H_2O$ and added to above solution from step 1.

3. 7.9772 g of $Co(NO_3)_2.6H_2O$ were dissolved in 25 ml $H_2O$ and added to above solution from step 2.

4. 1.4744 g of $Cr(NO_3)_3.9H_2O$ were dissolved in 20 ml $H_2O$ and added to above solution from step 3.

5. 0.0662 g of $Al(NO_3)_3.9H_2O$ were dissolved in 10 ml $H_2O$ and added to above solution from step 4.

6. 0.4368 g of $H_3BO_3$ were dissolved in 10 ml $H_2O$ warm water and added to above solution from step 5.

7. 2.244 g of $Pb(C_2H_3O_2)_2.3H_2O$ were dissolved in 20 ml $H_2O$ heated and added to above solution from step 6, and 20 drops $HNO_3$ added (use small magnetic stirrer) (note—above solution slightly turbid but filtering was not found to be necessary).

8. 0.0333 g of $KC_2H_3O_2$ were dissolved in 5 ml $H_2O$ and added to above solution from step 7.

TABLE 1

| MO | Final Wt. % | Precursor | *Conversion MO Precursor Salt | Precursor for a 200 ml Stock Solution to give the % MO in 10 ml for a 100 g Charge |
|---|---|---|---|---|
| ZnO | 92.20 | ZnO | Not applicable | |
| $MnO_2$ | 0.70 | Manganese Acetate $Mn(C_2H_3O_2.4H_2O)$ | 2.819 | 39.466 |
| $Co_3O_4$ | 1.60 | Cobalt Acetate $Co(CH_3COO)_2.4H_2O$ | 3.103 | 99.296 |
| | | but preferably: Cobalt Nitrate $Co(NO_3)_2.6H_2O$ | 3.626 | 116.029 |
| $Cr_2O_3$ | 0.14 | Chromium Nitrate $Cr(NO_3)_3.9H_2O$ $Sb_2O_3$ | 5.266 | 14.7448 |
| $Sb_2O_3$ | 0.16 | Antimony Potassium Tartrate $K(SbO)C_4H_4O_6.\frac{1}{2}H_2O$ | 2.291 | 7.3312 |
| | | but preferably: Antimony Trichloride $SbCl_3$ | 1.565 | 5.008 |
| $Bi_2O_3$ | 4.00 | Bismuth Nitrate $Bi(NO_3)_3.5H_2O$ | 2.082 | 166.56 |
| $TiO_2$ | 0.8 | Titanium Tetrachloride $TiCl_4$ | 2.374 | 37.984 |
| | | but preferably: Titanium Oxide as Colloidal Suspension | 1.00 | 16.00 |
| PbO | 0.4 | Lead Acetate $Pb(C_2H_3O_2)_2.3H_2O$ | 1.700 | 13.6 |
| $Al_2O_3$ | 0,003 | Aluminum Nitrate $Al(NO_3)_3.9H_2O$ | 7.358 | 0.441 |
| $K_2O$ | 0.01 | Potassium Acetate $KC_2H_3O_2$ | 2.084 | 0.4168 |

Total MO = 100.013 g if all oxides are to be added and 100.0 if $Al_2O_3$ and $K_2O$ are not to be added.

$$\text{Conversion} = \frac{\#\text{ atoms of metal in mol. wt. of oxide} \times \text{mol. wt. of salt}}{\#\text{ atoms of metal in mol. wt. of salt} \times \text{mol. wt. of oxide}}$$

9. 4.5104 g of $Mn(C_2H_3O_2)_2.4H_2O$ were dissolved in 30 ml of cold $H_2O$ and added to above solution from step 8.

10. 0.3443 g of $SbCl_3$ (weighed out in beaker) were dissolved in 20 ml of 1:1 HCl added dropwise with vigorous stirring and transfer with 1:1 HCL to above solution from step 9.

11. 1.6 g of $TiO_2$ were suspended in 50 ml of $H_2O$ and added to above solution from step 10, and;

12. 184.869 g of ZnO (ST JOE 922) with a surface area of 3.6 $m^2g$ and an average particle diameter of 0.30 $\mu$m, were added to above suspension and five drops of Darvan "C" were added as a deflocculent with stirring forming a uniform suspension with a % solids content of about 36%.

13. The above suspension was brought to near dryness while stirring and heating on a hot plate.

14. The above mixture was dried overnight in a drying oven set at 90° C.

15. The dried powder was gently crushed using a mortar and pestle, passed through a 60 mesh nylon sieve, transferred to a 200 ml $Al_2O_3$ crucible, and then calcined at 750° C. The calcination included a 5 minute hold at 100° C. for complete moisture removal, a 10 minute hold at 260° C. for the nitrate evolution from $Bi(NO_3)_3$ and other nitrate salts, and another 15 minute hold at 380°-400° C. for the evolution of oxides of nitrogen from the thermal decomposition of residual nitrates.

16. The above powder obtained from the calcination was gently ground and sieved, $H_2O$ was added to give a 30-50% solids, enough ($\approx$40 ml) of a 5% PVA solution was added to give a final concentration of 1.0% PVA, 17. The above slurry was pan dried, on a hot plate with stirring, dried in an oven at 90° C. overnight, gently ground and sieved through a 60 mesh sieve.

18. The pan dried powder was pressed into the appropriate configuration and then sintered for 2 hours at 1450° C. with a heating rate of 10° C./min. and a cooling rate of 2.5° C./min.

19. The resultant sintered bodies were selectively coated with aluminum then copper, had electrical leads attached, and encapsulated in an epoxy resin.

EXAMPLE 3

Example for High Voltage Varistor

This composition contains three metal oxide additives to ZnO, two of which are in exceptionally high concentrations i.e., PbO and $Bi_2O_3$. In addition, using the soluble salt approach, a primary determinant of the final sintered grain size, and therefore clamping voltage, is the particle size of the initial ZnO. Consequently, for the smallest sintered grain size and highest clamping voltage, a well crystallized ZnO of the smallest available particle size ZnO is preferred; therefore the use of 911 St. Joe ZnO with average particle size of 0.1 $\mu$m and surface area of 9.5 $m^2/g$.

This preferred example is formulated as:

| MO | Formulated Wt. % | Amount of Precursor Salt, Sequence and Mode of Addition for a 200 g Preparation |
|---|---|---|
| $Co_3O_4$ | 2.0 | 14.504 g of Fisher $Co_2(NO_3)_2.6H_2O$ dissolved in 50 ml of deionized $H_2O$ in a 1000 ml beaker. |
| PbO | 13.85 | 47.09 g $Pb(C_2H_3O_2)_2.3H_3O$ dissolved in 125 ml of deionized $H_2O$ in a 250 ml beaker while heating and adding 10 drops of $HNO_3$. This is filtered and washed with dilute $HNO_3$ (10 drops/100 ml $H_2O$) during transfer to the cobalt nitrate solution to prevent precipitate formation in washings. |
| $Bi_2O_3$ | 16.16 | 67.29 g $Bi(NO_3)_3.5H_2O$ is dissolved in 120 ml of 10% $HNO_3$ with heating, in a 250 ml beaker. Before addition of this solution to the above Co—Pb solution, 20 ml of $HNO_3$ is added to the receiving solution. Then the mixture is heated and stirred. The heating and the higher acidity redissolves a white precipitate which begins to form as the bismuth solution is added. |
| ZnO | 67.99 | Five drops of Darvan C is added to the above, then 135.98 g St. Joe 911 ZnO are added while stirring to give a thick paste. |

The above paste is then dried at 70° C. for two days. After a mild grinding operation and sieving thru a 60 mesh sieve, the powder is ready for calcination.

EXAMPLE 4

Example 4 used the same concentrations as example 2 but used stock solutions from Example 1.

Note: For $Bi_2O_3$ and $MnO_2$ the amount of salt required is preferably prepared just before use instead of taking aliquots from a stock solution. Also for $TiO_2$, a suspension is also prepared just before use.

| MO | Formulated Wt. % | Ml Required of Indicated Stock Solution for 200 g Preparation |
|---|---|---|
| $Bi_2O_3$ | 3.90 | 16.2396 g $Bi(NO_3)_3.5H_2O$ dissolved in 100 ml of 10% $HNO_3$ before use. |
| $Co_3O_4$ | 1.10 | 13.75 ml of stock sólution contains 116.029 g $Co(NO_3)_2.6H_2O$/200 ml $H_2O$. |
| $MnO_2$ | 0.80 | 4.5104 g Mn $(C_2H_3O_2)_2.4H_2O$ dissolved in 50 ml $H_2O$ at room temperature just before use. |
| $TiO_2$ | 0.80 | 1.6 g $TiO_2$ suspended in 50 ml $H_2O$ just before use. |
| PbO | 0.34 | 17.0 ml of stock solution contains 13.6 g $Pb(C_2H_3O_2)_2.3H_2O$/200 ml $H_2O$ (slightly acidic with $HNO_3$). |
| $Cr_2O_3$ | 0.14 | 20.0 ml of stock solution contains 14.7448 g $Cr(NO_3)_3.9H_2O$/200 ml $H_2O$. |
| $Sb_2O_3$ | 0.11 | 13.75 ml stock solution contains 5.008 g $SbCl_3$/200 ml $H_2O$. |
| NiO | 0.24 | 17.14 ml of stock solution contains 21.7952 g $Ni(NO_3)_2.6H_2O$/200 ml $H_2O$. |
| $Al_2O_3$ | 0.0045 | 30.0 ml of stock solution contains 0.441 g $Al(NO_3)_3.9H_2O$/200 ml $H_2O$. |
| $K_2O$ | 0.008 | 20 ml of stock solution contains 0.3334 g $KC_2H_3BO_3$/200 ml $H_2O$. |
| $B_2O_3$ | 0.123 | 20 ml of stock solution contains 4.3690 g $H_3BO_3$/200 ml $H_2O$. |
| ZnO | 92.434 | Not applicable (184.868 g St. Joe 922 ZnO) |

The sequence of addition is:

Bismuth nitrate, nickel nitrate, cobalt nitrate, chromium nitrate, aluminum nitrate, boric acid, lead acetate, potassium acetate, manganese acetate, antimony chloride, titanium dioxide and zinc oxide. Use Darvan "C" during final mixing.

The advantages of the process of the present invention include:

- Exceptionally uniform dispersion of additives both chemically and physically.
- Incorporation of additives on a nanometer scale leads to reduced calcining and sintering temperatures.
- Enhanced chemical homogeneity aids microstructure control, especially grain size, which is a critical factor in determining electrical properties.
- The use of soluble salt precursors eliminates property differences inherent in the use of variant oxide materials such as those employed in conventional ceramic processing.
- Soluble salt processing has the potential for reducing the number of steps needed to achieve chemical homogeneity compared to conventional ceramic processing.

Varistors made by the new improved process have shown excellent electrical characters as shown in Table II.

TABLE II

| Varistor Sample | A at 1 Volt | A at 16 Volts | V at 10 A |
|---|---|---|---|
| S8-11 | $3.07 \times 10^{-8}$ | $6.16 \times 10^{-6}$ | 35.6 |
| S8-24 | $2.74 \times 10^{-8}$ | $5.32 \times 10^{-6}$ | 36.7 |
| S8-26 | $2.54 \times 10^{-8}$ | $3.58 \times 10^{-6}$ | 38.7 |
| S8-29 | $3.02 \times 10^{-8}$ | $4.97 \times 10^{-6}$ | 37.2 |
| S8-33 | $1.63 \times 10^{-8}$ | $2.40 \times 10^{-6}$ | 39.7 |
| S8-15 | $7.66 \times 10^{-9}$ | $1.85 \times 10^{-6}$ | 41.2 |
| S8-32 | $2.64 \times 10^{-8}$ | $6.66 \times 10^{-6}$ | 40.4 |

The varistors S8-11, 15, 24, 26, 29, 32 and 32 were made from example 4 preparation.

A=amps

V=volts

A at 1 volt=leakage current

A at 16 V=amps at standby voltage in automotive application.

V at 10 A=to clamping voltage during Load Dump Automotive Test using a 8×20 μs wave from a surge generator.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for making a homogeneous metal oxide varistor power comprising the steps of:

(A) dissolving in an aqueous solvent from about 6.9 w/o to about 33.0 w/o of soluble compounds, which are soluble in water or acid, to form an aqueous solution, said soluble compounds containing metals which are desired in a homogeneous metal oxide varistor powder, said metals being selected from the group consisting of Al, B, Bi, Co, Cr, K, Mn, Ni, Pb, Sb and combinations thereof;

(B) mixing from about 68.0 w/o to about 93.2 w/o of insoluble compounds, as a powder, which are not soluble in water or acid, into the aqueous solution of step (A) to form a solution containing a suspension, said insoluble compounds being selected from the group consisting of ZnO, $TiO_2$ and combinations thereof;

(C) evaporating to dryness the solution containing the suspension from step (B) to form a homogeneous material; and (D) calcining the homogeneous material from step (C) to an oxide of each metal contained therein at temperatures up to 800° C. to form a homogeneous metal oxide varistor powder.

2. A process for making a homogeneous metal oxide varistor powder comprising the steps of:

(A) dissolving in an aqueous solvent from about 6.8 w/o to about 33.0 w/o of soluble compounds which are soluble in water or acid to form an aqueous solution, said soluble compounds containing metals which are desired in a homogeneous metal oxide varistor powder, said metals being selected from the group consisting of Al, B, Bi, Co, Cr, K, Mn, Ni, Pb, Sb and combinations thereof;

(B) mixing from about 68.0 w/o to about 93.2 w/o of insoluble compounds which are not soluble in water or acid, as a powder, into the aqueous solution of step (A) to form a solution containing a suspension, said insoluble compounds being selected from the group consisting of ZnO, $TiO_2$ and combinations thereof;

(C) evaporating to dryness the solution containing the suspension from step (B) to form a homogeneous dried cake;

(D) comminuting the dried cake of step (C) to form a powder;

(E) calcining the powder of step (D) up to about 800° C. to remove volatiles and to convert the powder to the oxides of each metal present to form a sintered powder;

(F) comminuting the sintered powder of step (E) to form a fine sintered powder;

(G) adding and mixing binders to the fine sintered powder from step (F) to form a homogeneous slurry;

(H) drying the slurry from step (G) to form a dried powder;

(I) pressing the dried power of step (H) at a temperature up to about 1400° C. to form a sintered body;

(J) applying an electrically conductive coating for attaching electrical leads to the sintered body of step (I);

(K) attaching electrical leads to the sintered body of step (J); and (L) encapsulating the body from step (K) to form an encapsulated homogeneous metal oxide varistor.

3. A process in accordance with claim 2 wherein said drying in step (H) is pan drying.

4. A process in accordance with claim 2 wherein said drying in step (H) is spray drying.

5. A encapsulated homogeneous metal oxide varistor made by the process in accordance with claim 2.

* * * * *